(12) United States Patent
Chan

(10) Patent No.: US 9,467,416 B2
(45) Date of Patent: Oct. 11, 2016

(54) METHODS AND SYSTEMS FOR DYNAMIC DOMAIN NAME SYSTEM (DDNS)

(71) Applicant: Pismo Labs Technology Limited, Hong Kong (HK)

(72) Inventor: Ho Ming Chan, Hong Kong (HK)

(73) Assignee: PISMO LABS TECHNOLOGY LIMITED (HK)

( * ) Notice: Subject to any disclaimer, the term of this patent is extended or adjusted under 35 U.S.C. 154(b) by 0 days.

(21) Appl. No.: 14/127,976

(22) PCT Filed: May 23, 2013

(86) PCT No.: PCT/IB2013/054261
§ 371 (c)(1),
(2) Date: Dec. 20, 2013

(87) PCT Pub. No.: WO2014/188233
PCT Pub. Date: Nov. 27, 2014

(65) Prior Publication Data
US 2015/0032869 A1    Jan. 29, 2015

(51) Int. Cl.
*G06F 15/16* (2006.01)
*H04L 29/12* (2006.01)
(Continued)

(52) U.S. Cl.
CPC ....... *H04L 61/1511* (2013.01); *H04L 41/0816* (2013.01); *H04L 61/2076* (2013.01); *H04L 67/26* (2013.01); *H04L 61/6068* (2013.01)

(58) Field of Classification Search
CPC .............. H04L 61/1511; H04L 29/12066; H04L 61/1552; H04L 29/1233; H04L 29/12952; H04L 61/6077; H04L 61/2076; H04L 29/12424
See application file for complete search history.

(56) References Cited

U.S. PATENT DOCUMENTS

2007/0291764 A1* 12/2007 Wu .......................... 370/395.5
2009/0135751 A1* 5/2009 Hodges et al. ............ 370/311
2010/0281146 A1* 11/2010 Lee ........................... 709/221
(Continued)

FOREIGN PATENT DOCUMENTS

CN    101478553 A    7/2009
CN    101442566 B    7/2012
CN    102932496 A    2/2013

OTHER PUBLICATIONS

International Search Report in International Application No. PCT/IB2013/054261, mailed on Mar. 6, 2014.
(Continued)

*Primary Examiner* — Tauqir Hussain
*Assistant Examiner* — Kamran Mohammadi

(57) ABSTRACT

A method carried out by a network node for sending update messages to a server when a predefined event occurs or periodically. The network node comprises a plurality of network interfaces. The update message is embedded with a unique identifier corresponding to the network node, and a network interface identifier corresponding to at least one of the plurality of network interfaces. In particular, the network interface identifier is corresponding to network interface(s) at which a predefined event has occurred. The present invention further comprises a method carried out by a server for resolving a DNS request by retrieving DNS resource records of a network node and/or network interface specified in the DNS request, and replying to the DNS request with the DNS resource records. The DNS resource records are created based on in part at least one update message received from the network node.

14 Claims, 9 Drawing Sheets

(51) Int. Cl.
    *H04L 12/24*     (2006.01)
    *H04L 29/08*     (2006.01)

(56) References Cited

U.S. PATENT DOCUMENTS

2012/0036233 A1*   2/2012   Scahill et al. ................. 709/220
2014/0078979 A1*   3/2014   Melia et al. .................. 370/329
2014/0089523 A1*   3/2014   Roy et al. ..................... 709/242
2014/0173123 A1*   6/2014   Graessley et al. ............ 709/228

OTHER PUBLICATIONS

Written opinion of the International Searching Authority in International Application No. PCT/IB2013/054261, mailed on Mar. 6, 2014.

* cited by examiner

METHODS AND SYSTEMS FOR DYNAMIC DOMAIN NAME SYSTEM (DDNS)

TECHNICAL FIELD

The invention relates generally to the field of computer networks. More particularly, the present invention relates to methods and systems for providing Dynamic Domain Name System (DDNS) service for network nodes comprising multiple network interfaces.

BACKGROUND ART

Dynamic DNS (DDNS) is a method of updating, in real time, a Domain Name System (DNS) to point to a changing IP address on the Internet. This is used to provide a persistent domain name for a resource that may change location on the network. Network devices have been incorporating DDNS technology to allow network devices to communicate with other hosts with a persistent domain name. The standardized method of dynamically updating domain name server records is prescribed by Internet Engineering Task Force (IETF) Request for Comments (RFC) 2136, commonly known as dynamic DNS update. The method described by RFC 2136 is a network protocol for use with managed DNS servers, and it includes a security mechanism. RFC 2136 supports all DNS record types, but often it is used only as an extension of the DHCP system, and in which the authorized DHCP servers register the client records in the DNS. This form of support for RFC 2136 is provided by a plethora of client and server software, including those that are components of most current operating systems. Support for RFC 2136 is also an integral part of many directory services, including LDAP and Windows' Active Directory domains.

It is a common feature for state-of-art network devices to deploy DDNS by using existing DDNS services like dyn-.com or no-ip.com or the use of custom services hosted by the manufacturer themselves. Most web-based DDNS services use a standard username and password security schema. This requires that a user first create an account at the DDNS server website and then configure their device to send updates to the DDNS server whenever an IP address change is detected. This is the method used by almost all web based DDNS services.

Some device manufacturers only allow their DDNS Service to be used by the devices they manufacture, and also eliminate the need for user names and passwords altogether. This is accomplished by encrypting the device's MAC address using an encryption algorithm kept secret on both the DDNS server and within the device's firmware. The resulting decryption or decryption failure is used to secure or deny updates respectively.

However, the process of choosing and assigning a domain name to network device takes time. Further when the network device has a plurality of network interfaces to be assigned with a domain name, the state-of-art DDNS is not able to choose and assign domain names for specific network interface of a network device.

SUMMARY

According to one of the embodiments the present invention, when a network node is able to connect to a first server through a specific network interface, or a predefined event occurs at the specific network interface, the network node sends an update message to the first server. The update message contains a unique identifier corresponding to the network node. The unique identifier cannot be changed by the user. The unique identifier is unique to the first server such that no two network nodes can send update messages to the first server with the same unique identifier. The unique identifier follows the specification of a domain name. A predefined event that causes the network node to send an update message includes change of IP address at at least of the network interface of the network node, assignment of an IP address at one of the network interface of the network node, access link connection detected at one of the network interface of the network node, access link disconnection at one of the network interface of the network node, update of DNS resource record, and any event that result in a new entry at a event log of the network node. In one variant, the update message is encrypted. In one variant, the update message also contains the identity of the network interface that sends the update message. In one variant, for each network interface that the network node is able to connect to the first server, the network node send update messages through each of the network interface. In one variant, the network node sends a plurality of the same update message to the first server through a plurality of the network interfaces. In one variant, the update message is sent by the network node periodically. In one variant, the update message sent is used to determine the status of the network node by the first server.

According to one of the embodiments of the present invention, when a first server receives a DNS request containing the unique identifier of a network node, the first server retrieves DNS resource records from its computer readable storage medium corresponding to the unique identifier and then replies to the DNS request with the DNS resource records. In one variant, the DNS request contains the unique identifier and a network interface identifier and the first server retrieves DNS resource records corresponding to the unique identifier and the network interface identifier from its computer readable storage medium and then replies to the DNS request with the DNS resource records.

The first server can be implemented as a Dynamic Domain Name System (DDNS) server. Alternatively, the first server is implemented as a Domain Name System (DNS) server that is capable of receiving update message and changing its DNS resource records according to the update message. Alternatively, the first server is a computing device that is capable of receiving update messages, processing the update messages, changing its DNS resource records according to the update message, and replying to DNS request. Preferably, the first server is implemented by customizing a DDNS server to handle the update message and DNS request described herein.

DISCLOSURE OF INVENTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processing unit(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

FIG. 1 illustrates a network environment where network node 104 connects to interconnected networks 101 via network interfaces 104a, 104b and/or 104c. In one of the embodiments, network node 104 sends an update message to first server 102 through interconnected networks 101 whenever a predefined event occurs. A predefined event occurs when an IP address of at least one of the network interfaces has changed, an IP address has been assigned to at least one of the network interfaces, DNS resource records corresponding to at least one of the network interfaces has changed, availability of at least one of the network interfaces has changed, or performance observed at at least one network interface has changed. For example, if IP address of network interface 104a changed, the update message is embedded with a unique identifier corresponding to network node 104, a network interface identifier corresponding to network interface 104a, and an updated IP address or DNS resource record of network interface 104a. Host 103 sends a DNS request to first server 102 through interconnected networks 101. Interconnected networks 101 may be the Internet or any other network.

When the request is received by first server 102, first server 102 inspects the request to determine which network node's or network interface's DNS resource records host 103 requests. When first server 102 has determined identity of the network node or the network interface, it retrieves the corresponding DNS resource record(s) from a computer readable storage medium, and sends the DNS resource record(s) to host 103 via interconnected networks 101 in a DNS reply.

According to one of the embodiments of the present invention, first server 102 is implemented as a Dynamic Domain Name System (DDNS) server. Alternatively, first server 102 is implemented as a Domain Name System (DNS) server that is capable of receiving update message and changing its DNS resource record according to the update message. Alternatively, first server 102 is a computing device that is capable of receiving update messages, processing the update messages, changing its DNS resource record according to the update message, and replying to a DNS request.

When the first server is implemented as a DDNS server, the DDNS server follows the mechanism described in IETF RFC 2136.

Request includes DNS query that a DNS query is considered as a request for the purpose of readability in this invention.

System:

FIG. 6A is a block diagram of a network node, such as network node 104, according to one of the embodiments of the present invention. Network node 104 comprises processing unit 602, main memory 603, system bus 604, secondary storage 605, and network interfaces 104a, 104b and 104c. Processing unit 602 and main memory 603 are connected to each other directly. System bus 604 connects processing unit 602 directly or indirectly to secondary storage 605, and network interfaces 104a, 104b and 104c. Using system bus 604 allows network node 104 to have increased modularity. System bus 604 couples processing unit 602 to secondary storage 605, and network interfaces 104a, 104b and 104c. System bus 604 can be any of several types of bus structures including a memory bus, a peripheral bus, and a local bus using any of a variety of bus architectures. Secondary storage 605 stores program instructions for execution by processing unit 602. Secondary storage 605 further stores a unique identifier corresponding to network node 104 and network interface identifiers corresponding to network interfaces 104a, 104b and 104c. Processing unit 602 may execute various program instructions for methods conducted at network node 104 that are described herein.

FIG. 6B is a block diagram of a server, such as first server 102, according to one of the embodiments of the present invention. First server 102 comprises processing unit 612, main memory 613, system bus 614, secondary storage 615, and network interface 616. Processing unit 612 and main memory 613 are connected to each other directly. System bus 614 connects processing unit 612 directly or indirectly to secondary storage 615, and network interface 616. Using system bus 614 allows first server 102 to have increased modularity. System bus 614 couples processing unit 612 to secondary storage 615, and network interface 616. System bus 614 can be any of several types of bus structures including a memory bus, a peripheral bus, and a local bus using any of a variety of bus architectures. Secondary storage 615 is a computer readable storage medium of first server 102. Secondary storage 615 stores program instructions for execution by processing unit 612. Secondary storage 615 further stores contents of update messages embedded in IP data packets sent by a network node. The contents stored include the unique identifier corresponding to the network node, network interface identifiers corresponding to network interfaces of the network node, and updated IP addresses of the network interfaces. In addition to that, secondary storage 615 also stores all types of DNS resource records of the network interfaces that have been provided by the network node to first server 102 in an update message. Processing unit 612 may execute various program instructions for methods conducted at first server 102 that are described herein.

When first server 102 receives a DNS request from a host via network interface 616, processing unit 612 inspects the DNS request to identify network interface(s) whose DNS resource records are requested by the host. After identifying the network interface(s), processing unit 612 retrieves DNS resource records of the network interface(s) from secondary storage 615 and sends the DNS resource records to the host in a DNS reply in the form of an IP data packet via network interface 616.

Method

FIG. 2A illustrates the format of update message 201 created at network node 104 according to one of the embodiments. FIG. 2A is viewed in conjunction with FIG. 1 for better understanding of the embodiments. Update message 201 is sent by a network node, such as network node 104, when a predefined event occurs at one or more network interfaces of network node 104. Update message 201 can be embedded in an IP data packet. The format of update message 201 illustrated in FIG. 2A does not show the format of the IP data packet embedding update message 201. Update message 201 comprises unique identifier 202, and network interface identifier 203. Update message 201 may further comprise IP address field 204, record type 205 and options field 206.

In one of the embodiments, unique identifier 202 is a character string which may include a serial number, a MAC address, or any other value that is unique to the network node. No two network nodes are allowed to send an update message containing the same character string in unique identifier 202. Unique identifier 202 cannot be changed by the user. The unique identifier follows the specification of a domain name. For example, the unique identifier is represented as a string "82211s182.device" and "82211s182" is the serial number of the network node. Alternatively, when the unique identifier includes a MAC address, the unique identifier can be "DD-BA-D0-86-BB-F7.manufacturer.com" and "DD-BA-D0-86-BB-F7" is the MAC address of one of the network interface of the network node.

In one of the embodiments, network interface identifier 203 is a character string that provides specific identification for a network interface of a network node. Network interface identifier 203 is unique to each network interface of the network node, such that no two network interfaces of the network node has the same network interface identifier 203. A network interface of one network node may have the same network interface identifier 203 as a network interface of another network node. This embodiment allows a reuse of network interface identifier 203 from the perspective of first server 102.

Alternatively, each network interface has a unique network interface identifier 203 to first server 102, regardless of which network node the network interface belongs. This embodiment does not allow a reuse of network interface identifier 203 from the perspective of first server 102. This embodiment also eliminates the need of unique identifier 202 because network interface identifier 203 can be used to identify the network node and the network interface. The network interface identifier 203 can be considered as a combination of unique identifier 202 and representation of the network interface.

In one of the embodiments, record type 205 indicates an updated DNS resource record type of a network interface specified by network interface identifier.

For example, if record type 205 is "MX", this indicates that IP address of the mail exchanger has changed, and the IP address specified in IP address field 204 is an updated mail exchanger IP address.

In one of the embodiments, options field 206 indicates what type of predefined event has occurred at network node 104. In one variant, options field 206 is used to indicate that IP address of a network interface indicated by network interface identifier 203 has changed, wherein the IP address is indicated by IP address field 203. In one variant, options field 206 is used to indicate that a network interface indicated by network interface identifier 203 has been assigned with an IP address, wherein the IP address is indicated by IP address field 203. In one variant, options field 206 is used to indicate that availability of a network interface indicates by network interface identifier 203 has changed.

For illustration purposes, when an access link disconnection is detected at network interface 104a, then update message 201 is sent to first server 102 through network interface 104b or 104c, wherein options field 206 comprises a character string indicating that the access link at network interface 104a is disconnected. Network interface identifier 203 specifies network interface 104a. The character string can be a predefined character string that indicates that an access link at a network interface, indicated by network interface identifier 203, is disconnected. In another example, when an access link connection is detected at network interface 104a, options field 206 of update message 201 contains a predefined character string indicating that an access link connection is detected at network interface 104a, wherein update message 201 is sent to first server 102 through network interface 104a, 104b or 104c. Similarly, options field 206 contains different predefined character strings corresponding to different types of predefined events occurring at network node 104. Options field 206 is required so that first server 102 can correctly be informed about what type of predefined event has occurred at a network node indicated by unique identifier 202 and/or at a network interface indicated by network interface identifier 203.

For example, if there is a change in IP address or a new IP address assignment of network interface 104a, update message 201 is sent to first server 102 using at least one network interface among network interfaces 104a, 104b and 104c. Unique identifier 202 contains a character string which is unique to network node 104 and network interface identifier 203 is a character string corresponding to network interface 104a. In one of the embodiments, IP address field 204 contains updated IP address of network interface 104a. In one of the embodiments, when record type 205 is omitted, an IP address in IP address field 204 refers to the updated IP address of network interface 104a by default. In one of the embodiments, when record type 205 is "A", an IP address in IP address field 204 refers to the updated IP address of network interface 104a.

Alternatively, if there is a change in IP address of network interface 104a, update message 201 is sent to first server 102 through network interface 104a. Unique identifier 202 contains a character string which is unique to network node 104 and network interface identifier 203 is a character string corresponding to network interface 104a.

In one of the embodiments, IP address field 204 is empty and first server 102 uses source IP address of update message 201 to determine the IP address of a network interface. If update message 201 is sent via network interface 104a to inform first server 102 of a change in network interface 104a, the source IP address of the IP data packet embedding update message 201 is used by first server 102 to determine the IP address of network interface 104a. Alternatively, if network interface 104a is assigned with an IP address that is not reachable by first server 102, IP address field 204 should not be omitted because first server 102 cannot reliably use the source IP address of the IP data packet, which embeds update message 201, to determine the IP address of network interface 104a.

In one of the embodiments, IP address field 204 is configured by a network administrator. If an IP address of a network node's network interface is a private IP address, IP address field 204 can contain a public IP address that is reachable by first server 102. Therefore first server 102, other hosts and nodes can use the public IP address to communicate with the network node.

In another example, if there is a change in IP address of a mail exchanger corresponding to network interface 104b, IP address field 204 is an updated IP address of the mail exchanger and record type 205 is "MX".

When an update message is received by first server 102, first server 102 stores information provided, such as DNS resource records of a network node and/or network interface corresponding to unique identifier 202 and/or network interface identifier 203 respectively, in secondary storage 615.

In one of the embodiments of the present invention, if IP address of more than one network interface has changed or has been assigned, IP address field 204 comprises updated IP addresses of the more than one network interface. This reduces the number of update messages.

In one of the embodiments of the present invention, update message 201 does not comprise network interface identifier 203 if update message is sent by a network node with only one network interface. In another variant, when a network node with multiple network interfaces sends update message 201, IP address field 204 contains multiple updated IP addresses of the multiple network interfaces respectively. Network interface identifier 203 contains network interface identifiers of the multiple network interfaces. Alternatively network interface identifier 203 is empty while IP address field 204 contains multiple updated IP addresses of the multiple network interfaces. As a result, any device trying to reach the network node can reach the network node by using any of the multiple updated IP addresses as a destination address, regardless of which one of the multiple network interface it corresponds to.

In one of the embodiments of the present invention, update message 201 is encrypted before being sent to first server 102. In one variant, update message 201 is encrypted with a shared key. In one variant, update message 201 is encrypted using certification-based encryption. Update message 201 is encrypted so that first server 102 can confirm authenticity of update message 201. With encryption, the IP address of the network node is more difficult to be recognized by others. In addition to authenticity, encryption can also be used to confirm integrity and confidentiality. Integrity of information provided in an update message can maintain and assure the accuracy and consistency of the IP address(es) embedded in update message 201. Confidentiality of update message 201 is also required in order to prevent disclosure of information provided in update message 201 to unauthorized individuals or systems.

FIG. 2B illustrates the format of request 211 according to one of the embodiments of the present invention. FIG. 2B is viewed in conjunction with FIG. 1 and FIG. 6B for better understanding. Request 211 is embedded in a DNS data section of a DNS request. The DNS request is an IP data packet. The DNS request can be sent by a host, such as host 103 to first server 102. For example, host 103 sends the DNS request to first server 102 via interconnected networks 101 for receiving DNS resource records of one or more interfaces of network node 104. Character string 212 specifies unique identifier of a network node and network interface identifier of a network interface according to one of the embodiments. First server 102 can interpret character string 212 to identify unique identifier of network node 104 and network interface identifier of one or more network interfaces of network node 104. When host 103 sends the DNS request to first server 102 via interconnected networks 101, first server 102 sends a DNS reply comprising updated IP addresses of the one or more network interfaces of network node 104 to host 103 via interconnected networks 101.

In one alternative, when network interface identifier is not specified in request 211, first server 102 identifies unique identifier of network node 104 from character string 212 and then sends a DNS reply comprising the IP address of all network interfaces of network node 104 to host 103.

In one alternative, character string 212 may specify network interface identifiers of more than one network interface. The DNS reply comprises IP addresses of the more than one network interface.

The DNS reply follows the DNS reply format of RFC 2629. Alternatively, the DNS reply follows a format that can be understood by host 103.

If a network interface identifier is specified in request 211, for example, the network interface identifier of network interface 104a is specified, first server 102 sends a DNS reply comprising IP address of network interface 104a. Alternatively, first server 102 sends a DNS reply comprising other DNS resource records of network interface 104a.

Request 211 may further comprise record type 213 according to one of the embodiments. Record type 213 is optional. Record type 213 is a string of characters that indicates a DNS resource record type of network node 104 that host 103 wants to receive from first server 102. For example, if record type 213 is "MX", and character string 212 specifies unique identifier of network node 104, first server 102 replies to request 211 with DNS reply comprising IP address of a mail exchanger of network node 104. In another example, if record type 213 is empty, and character string 212 specifies unique identifier of network node 104 and network interface identifier of network interface 104b, first server 102 replies to the DNS request with updated IP address of network interface 104b. In another example, if record type 213 is "A", and character string 212 specifies unique identifier of network node 104, but does not specify a network interface identifier, first server 102 replies to the DNS request with all DNS resource records of all network interfaces of network node 104.

FIG. 3 is a flowchart illustrating a process when the network node sends an update message to the server according to one of the embodiments. FIG. 3 is viewed in conjunction with FIG. 1 and FIG. 6A for better understanding of the embodiments.

In step 301, the process starts. In step 302, processing unit 602 determines whether a predefined event has occurred. If a predefined event has occurred, network node 104 sends an update message to first server 102 in step 304 via one of the network interfaces 104a, 104b, or 104c, which is able to communicate with first server 102. The process ends in step 305.

For illustration purpose, when IP address of network interface 104a has changed, network node 104 sends an update message to first server 102 in step 304 via any of the network interfaces 104*a*, 104*b* or 104*c*. The update message comprises a unique identifier specifying network node 104, a network interface identifier specifying network interface 104*a*, and updated IP address of network interface 104*a*. The update message may further comprise a record type specifying a DNS resource record of network interface 104*a* that has changed. Although it is possible that update message is sent via at least one specific network interface, such arrangement is unnecessarily restrictive and may result in late delivery of the update message. On the other hand, if the update message is sent via at least one specific network interface, processing unit 602 does not need to determine which network interface is used to send the update message and may result in faster delivery of the update message and/or lower processing power required. The update message may further comprise an options field indicating which type of predefined event has occurred at network node 104.

If, in step 302, network node 104 determines that a predefined event has not occurred, then in step 303, network node 104 determines whether an update message has been sent to first server 102 via network interfaces 104*a*, 104*b*, or 104*c* within a predefined amount of time. If an update message has not been sent to first server 102 via network interfaces 104*a*, 104*b* or 104*c* within the predefined amount of time, an update message is then sent to first server 102 in step 304. If an update message has been sent to first server 102 within the predefined amount of time, the process ends in step 305. For example, the predefined amount of time described in step 303 is thirty minutes. The pre-defined amount of time can be set by the user, a manufacturer or administrator of network node 104. Connection between network node 104 and first server 102 might fail at times, and if network node 104 tries to send an update message while the connection is down, the update message will not reach first server 102. Therefore, sending an update message to first server 102 periodically ensures that first server 102 is up to date about any predefined event occurring in network node 104 while the connection was down. In one alternative, sending an update message to first server 102 is for performing health checks. However, sending an update message to first server 102 periodically may take up additional bandwidth capacity causing the network performance to deteriorate and therefore, frequency of the health checks should not be large and number of bytes used by health checks should not be large.

In one of the embodiments of the present invention, step 303 is omitted. In step 302, if processing unit 602 determines that IP address of any of the network interfaces has not changed or has not been assigned, then the process ends in step 305 because there is no new information to be sent.

In one of the embodiments of the present invention, in step 304, network node 104 sends an update message to first server 102 using a network interface at which a predefined event has occurred. For example, if IP address of network interface 104*a* has changed, or an IP address has been assigned to network interface 104*a*, then network node 104 sends the update message to first server 102 using network interface 104*a* to keep first server 102 aware of the new IP address.

An update message can be sent to first sever 102 using various communication protocols such as Transmission Control Protocol (TCP), User Datagram Protocol (UDP), Internet Control Message Protocol (ICMP), Point-to-point Protocol (PPP), frame relay protocol, Address Resolution Protocol (ARP). It would be known to those skilled in the art that the update message can be sent using any protocol, as long as the update message can reach first server 102.

A predefined event that causes a network node to send an update message includes change of IP address at at least of the network interface of the network node, assignment of an IP address at one of the network interface of the network node, access link connection detected at one of the network interface of the network node, access link disconnection at one of the network interface of the network node, update of DNS resource record, detection of new Dynamic Host Configuration Protocol (DHCP) server, expiration of DHCP IP address lease, status check, health check, and any event that result in a new entry at an event log and could affect the IP address of any of the network node's network interfaces. This allows an update message to be sent upon a status change detected at the network node or a change to be occurred at the network node. DNS resource records at the first server 102 can then be refreshed or updated more frequently while not imposing heavy burden on the first server 102 and reduce the number of unnecessary update message.

An administrator of the network node is allowed to configure create, modify, delete and store predefined event. Alternatively, predefined events can be created and managed remotely through an access link connecting to one of the plurality of network interfaces. Alternatively, predefined events can be created and managed remotely through the Internet or cloud services. Alternatively, predefined events can be created by the manufacturer of the network node and managed by the administrator of the network node or by the manufacturer. The flexibility of creation and management of predefined event is important to allow the DDNS to have the most updated IP addresses and information of the network node and network interfaces of the network node.

The time period to send the update message is in the range of one minute to one month. In a preferred embodiment, the time period ranges from one hour to one day. When update message is sent to the first server 102 periodically, the update message can be used as a health-check message to ensure the network node is still in operation. If the time period is too short, the DDNS will receive large number of update messages. If the time period is too long, the usefulness of update message as health-heck message is reduced. There are myriad ways to set the time period. For example, it can be set by the administrator of the network node, remotely set by a cloud server or set by the manufacturer of the network node with a default value.

FIG. 4A illustrates a process of storing DNS resource records of a network node in a computer readable storage medium of a first server 102 when it receives an update message from the network node according to one of the embodiments. FIG. 4A is viewed in conjunction with FIG. 1, FIG. 6B and FIG. 2A for better understanding of the embodiments.

The process starts in step 401. In step 402, first server 102 receives an update message, such as update message 201, from network node 104. Update message 201 is embedded in an IP data packet and comprises unique identifier 202, network interface identifier 203, record type 205 and IP address field 204 comprising updated IP address of a network interface specified by network interface identifier 203 according to one of the embodiments.

In step 403, first server 102 authenticates update message 201 to confirm that update message 201 is authentic, and is sent by network node 104 and not a third party.

In step 405, unique identifier 202 is retrieved from update message 201. First server 102 uses unique identifier 202 to identify the network node sending update message 201.

In step 406, network interface identifier 203 is retrieved from update message 201. First server 102 uses network interface identifier 203 to identify a network interface whose DNS resource records are received in update message 201.

In step 407, updated IP address of the network interface specified by the network interface identifier is retrieved from IP address field 204 of update message 201. In step 408, the updated IP address is stored in secondary storage 615 for later retrieval and the process ends in step 420.

In one of the embodiments, in step 403, if update message 201 is encrypted by network node 104 with a shared key, first server 102 authenticates update message 201 if update message 201 can be successfully decrypted by the shared key. In one of the embodiments, in step 403, if update message 201 was encrypted by network node 104 using a certificate, first server 102 authenticates update message 201 by certification. It would be apparent to those skilled in the arts that there are many ways of confirming authenticity of update message 201. Authenticating update message 201 is important to ensure that no third party can send a similar update message with false information about the network node specified by a unique identifier. First server 102 needs to confirm that update message 201 is authentic, and is sent by the network node and not a third party.

Alternatively, update message 201 is sent by network node 104 to first server 102 using a secured connection. A secured connection can be formed by using Hypertext Transfer Protocol Secure (HTTPS), Transport Layer Security (TLS), Secure Sockets Layer (SSL) and other techniques. Those who are skilled in the arts would appreciate that there are myriad ways of forming secured connections between network node 104 and first server 102.

In one variant, the measure to protect the security of update message 201 is RFC 2137 or similar measures.

According to one of the embodiments, in step 407, DNS resource record(s) corresponding to the network interface is retrieved from update message 201. For example, if record type 205 of update message 201 is "MX", IP address of the mail exchanger of the network interface is retrieved from IP address field 204 of update message 201 in step 407.

In one of the embodiments, step 406 is omitted if update message 201 does not comprise network interface identifier 203. One of the scenarios when step 406 can be omitted is when a network node sending update message 201 comprises only one network interface. In this case, there is no need of including network interface identifier 203 in update message 201, and hence step 406 is omitted. Another scenario when step 406 can be omitted is when update message 201 is sent by a network node with multiple network interfaces, and IP address field 204 contains IP addresses of multiple network interfaces, but network interfaces corresponding to the IP addresses are not specified by network interface identifier 203. In this case, the IP addresses are stored and considered to be corresponding to the network node specified by unique identifier 202. Any device trying to reach the network node can do so by using any of the IP addresses as a destination address, regardless of which network interface of the network node it corresponds to.

The order of step 405, 406 and 407 are not inter-dependent such that the order of these steps can be in different order others than the one illustrated.

According to one of the embodiments of the present invention, when the source IP address of IP data packets originating from network node 104 is being translated to another IP address using network address translation (NAT) technique, the source IP address of the IP data packet embedding update message 201 is not the IP address of the network interface used for sending update message 201 by network node 104. First server 102 still uses the received source IP address of the IP data packets if update message 201 does not contain an IP address embedded in IP address field 204 to indicate the IP address of the network interface of network node 104. On the other hand, in step 407, first server 102 uses the IP address embedded in IP address field 204 of update message 201 as the IP address of the network interface of network node 104 if update message 201 has an IP address indicating the IP address of network node 104 or indicating the IP address of one of network interface of network node 104. First server 102 does not need to verify whether the IP address retrieved from update message 201 in step 407, or identified from the source address of the IP data packet, is reachable by first server 102 or by other host. This is because update message 201 is encrypted and the authenticity and integrity of update message 201 are protected.

FIG. 4B illustrates a process of storing DNS resource records of a network node in a computer readable storage medium at first server 102 when the first server 102 receives an update message from a network node according to one of the embodiments. FIG. 4B is viewed in conjunction with FIG. 1 and FIG. 2A for better understanding of the embodiments. The difference between FIG. 4A and FIG. 4B is that the process of FIG. 4A comprises step 407 while FIG. 4B comprises step 404 instead of step 407. FIG. 4A further comprises encryption of update message 201.

After receiving update message 201 from network node 104 in step 402, first server 102 identifies source IP address of update message 201 according to the header of IP data packet embedding update message 201 in step 404. The source IP address is recognized as the IP address of a network interface of network node 104. For comparison, in process of FIG. 4A, first server 102 relies on IP address field 204 to identify the IP address of the corresponding network interface instead of relying on the source IP address of update message 201. Unique identifier 202 and network interface identifier 203 are retrieved from update message 201 in steps 405 and 406 respectively. The source IP address identified in step 404 is stored in secondary storage 615 in step 408. The process ends in step 420.

In one variant, if update message 201 is not encrypted, first server 102 relies on the uniqueness of unique identifier 202 to ensure the IP address embedded in update message 201 or the source IP address of the IP data packet embedding update message 201. This variant is subject to middleman attack that can change the content of update message 201.

FIG. 5 illustrates a process of replying to a DNS request received by first server 102 from a host after DNS resource records have been stored in a computer readable storage medium of first server 102 according to one of the embodiments. FIG. 5 is viewed in conjunction with FIG. 1 and FIG. 6B for better understanding of the embodiments.

The process starts in step 501. Secondary storage 615 stores DNS resource records of network nodes, such as network node 104. In step 510, a DNS request is received by first server 102. A DNS request is sent by a host to first server 102 requesting for DNS resource records of one or more network interfaces of one or more network nodes. The DNS request is an IP data packet. The DNS request can be sent by a host, such host 103, requesting DNS resource records of one or more network interfaces of a network node. In step 511, a unique identifier is retrieved from the DNS request. The unique identifier specifies the network node. For example, when host 103 sends a DNS request requesting DNS resource records of network node 104, the unique identifier specifies network node 104.

In step 512, processing unit 612 executes instructions to retrieve a network interface identifier from the DNS request. The network interface identifier specifies a network interface, wherein DNS resource records of the network interface are requested by host 103.

In step 513, first server 102 determines whether retrieving a network interface identifier in step 512 was successful or not. If a network interface identifier could not be retrieved, first server 102 identifies a network node specified by the unique identifier, and DNS resource records of all network interfaces comprised in the network node are retrieved from secondary storage 615 in step 515.

If at least one network interface identifier is retrieved, first server 102 identifies at least one network interface of a network node according to the at least one network interface identifier, and DNS resource records of the at least one network interface are retrieved from secondary storage 615 in step 514.

In step 516, first server 102 determines whether at least one DNS resource record was found in secondary storage 615 in step 514 or 515. If no DNS resource records corresponding to the network node or the at least one network interface, first server 102 sends a DNS reply to host 103 in step 518, wherein the DNS reply does not comprise DNS resource records of the network interfaces comprised in the network node or the at least one network interface and the process ends in step 520.

If at least one DNS resource record corresponding to the at least one network interface or network interfaces comprised in the network node is found, first server 102 sends a DNS reply to host 103 in step 517, wherein the DNS reply comprises DNS resource records of the at least one network interface specified by the network interface identifier, or all network interfaces of the network node specified by the unique identifier and the process ends in step 520.

In one of the embodiments, the DNS request comprises a record type. For example, if the record type in the DNS request is "MX", first server 102 sends a DNS reply to host 103, wherein the DNS reply comprises IP address of a mail exchanger of the at least one network interface specified by the network interface identifier, or all network interfaces of the network node specified by the unique identifier.

Figure 1:
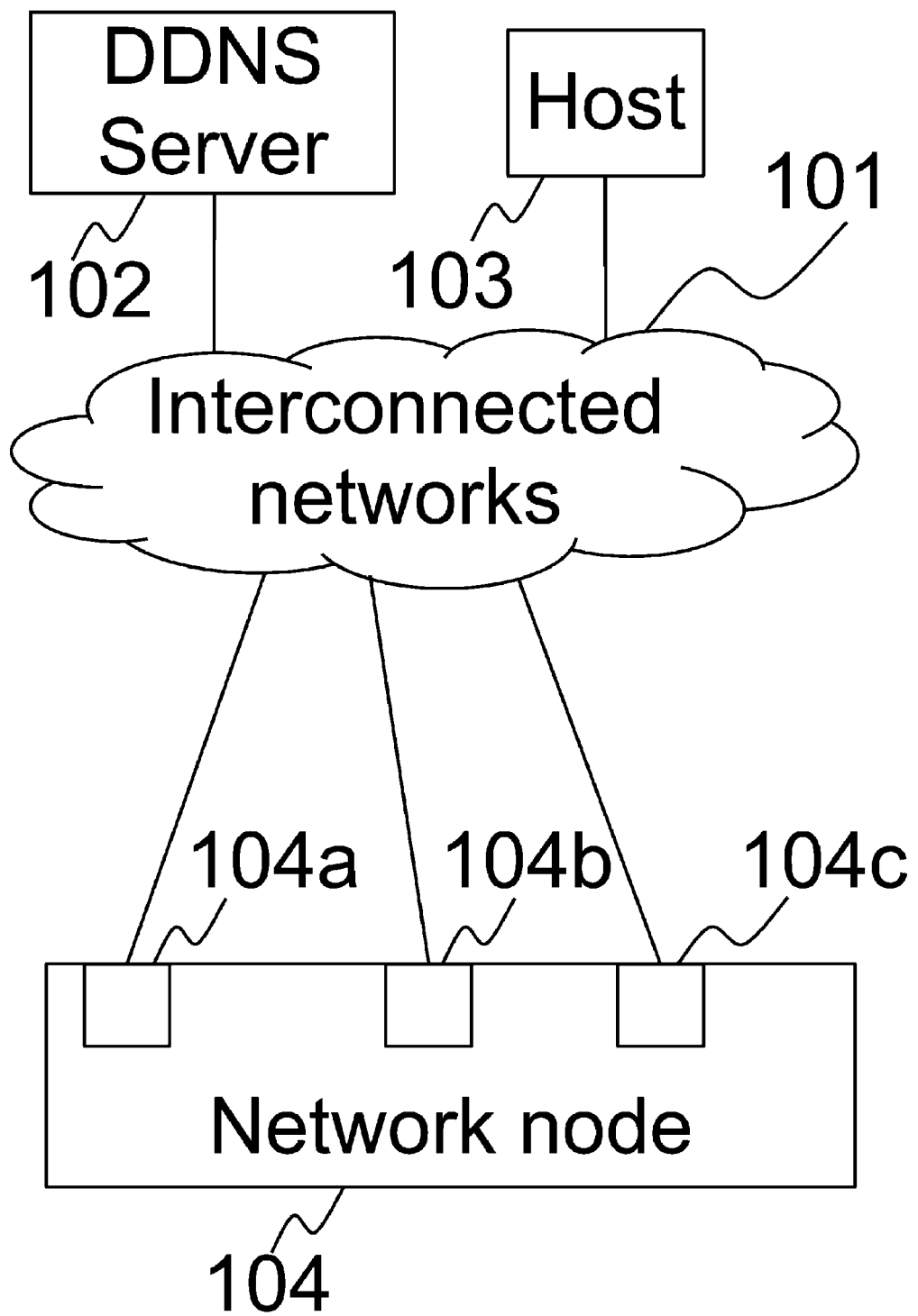
FIG. 1 is a network diagram illustrating a network environment according to one of the embodiments of the present invention.
Figure 2A:
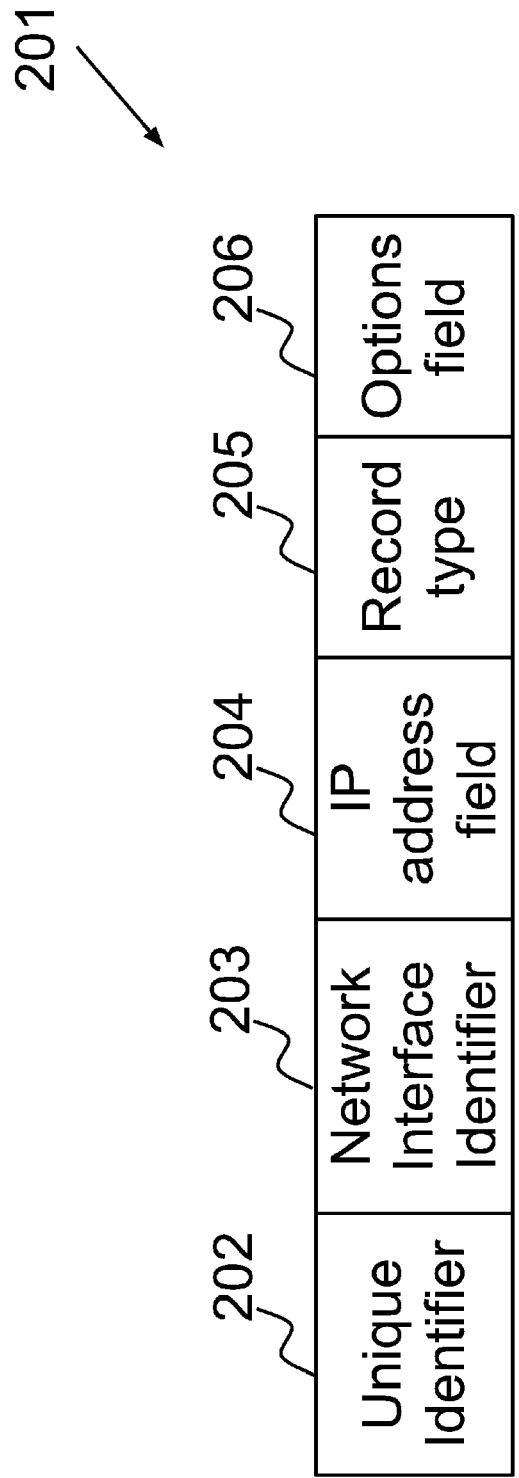
FIG. 2A illustrates the format of an update message created at network node according to one of the embodiments of the present invention.
Figure 2B:
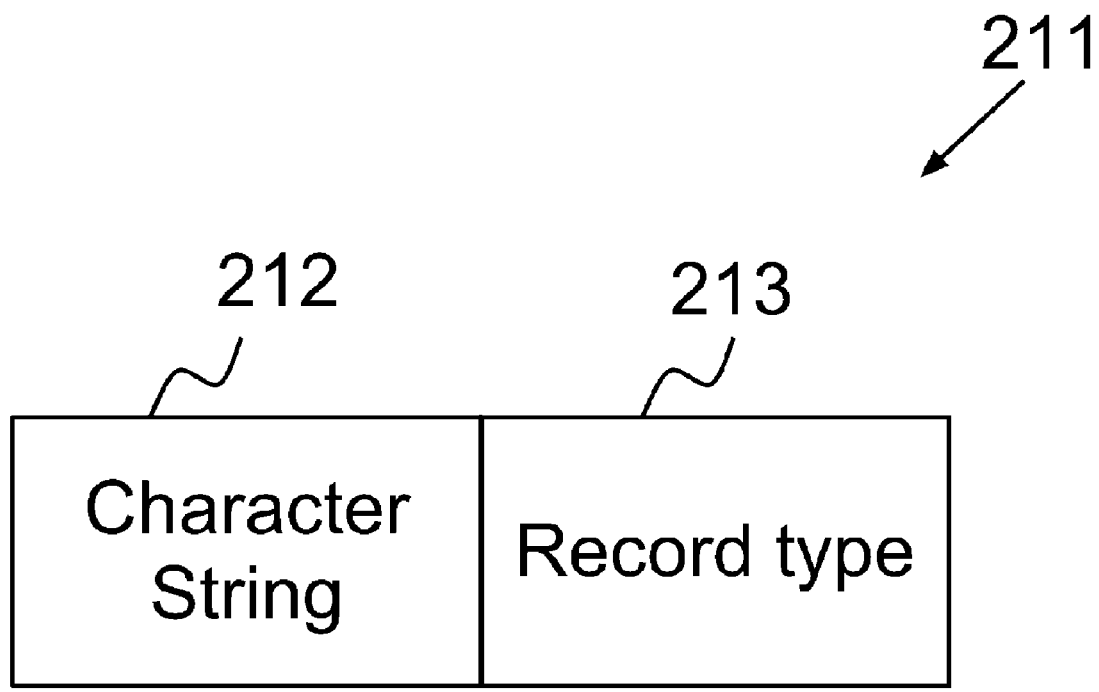
FIG. 2B illustrates the format of a request embedded in the DNS data section of a DNS request according to one of the embodiments of the present invention.
Figure 3:
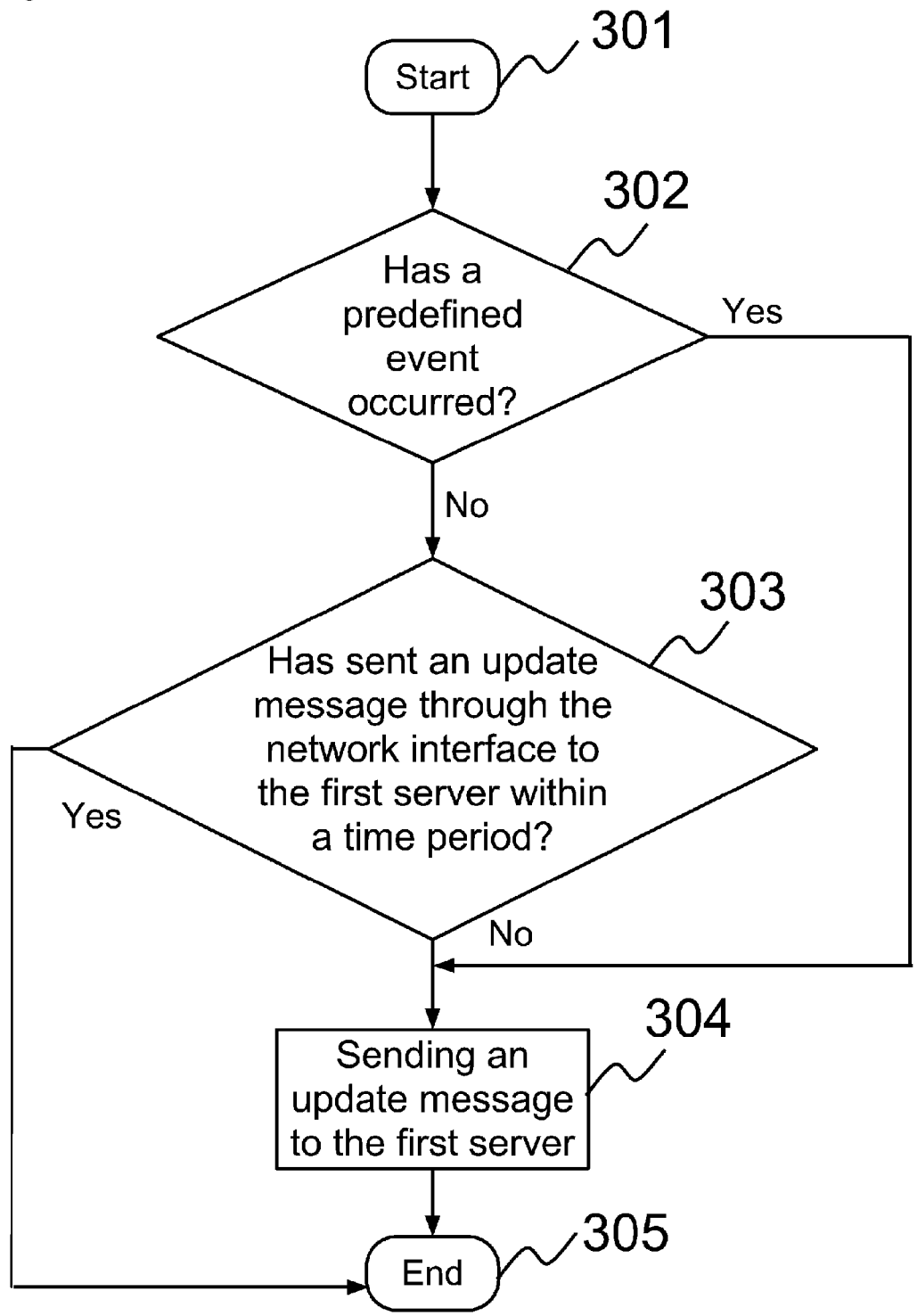
FIG. 3 is a flowchart illustrating a process when the network node sends an update message to the server according to one of the embodiments.
Figure 4A:
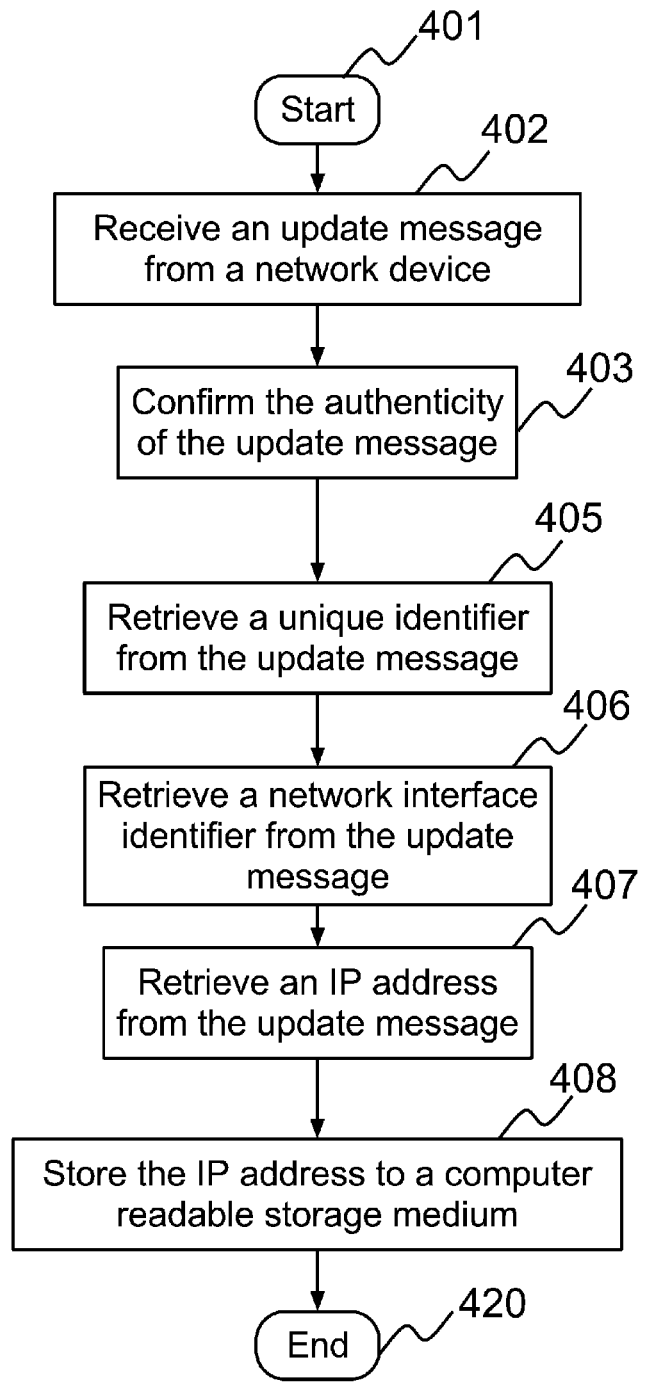
FIG. 4A illustrates a process of storing DNS resource records of a network node in a computer readable storage medium of a server when the server receives an update message from the network node according to one of the embodiments of the present invention.
Figure 4B:
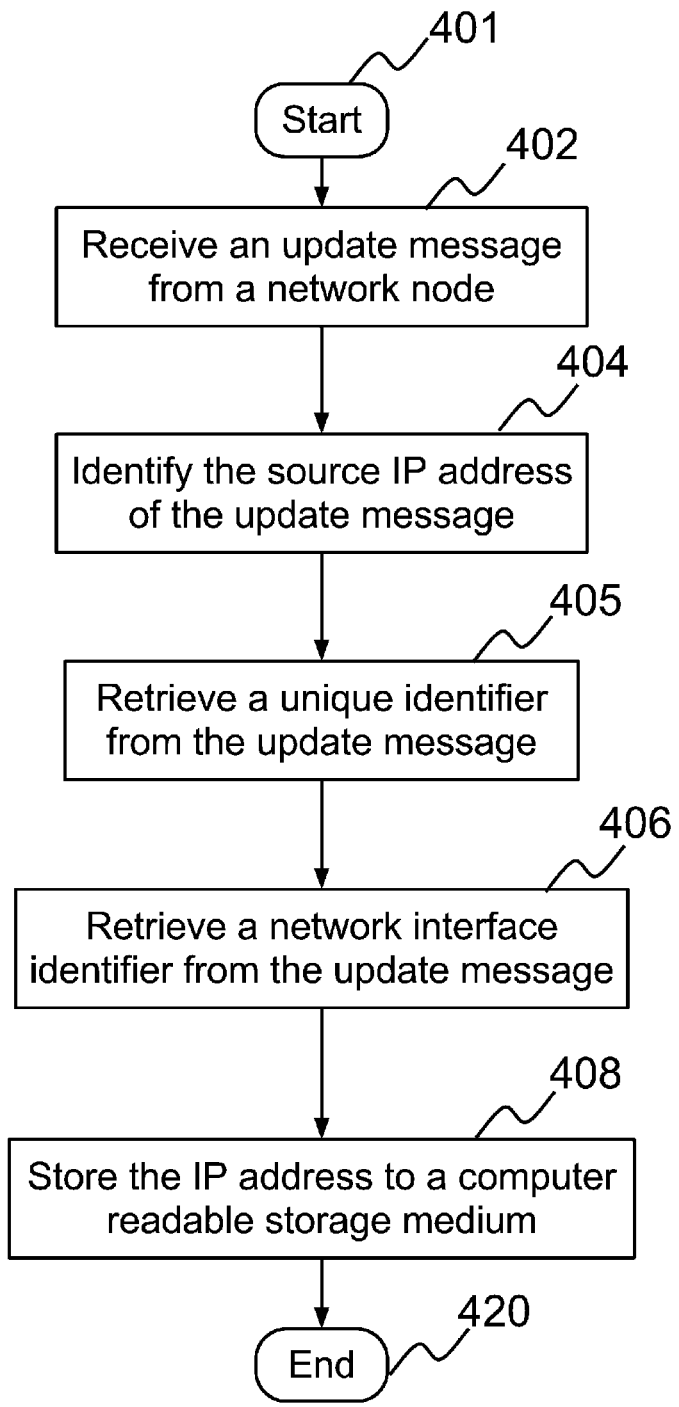
FIG. 4B illustrates a process of storing DNS resource records of a network node in a computer readable storage medium of a server when the server receives an update message from the network node according to one of the embodiments of the present invention.
Figure 5:
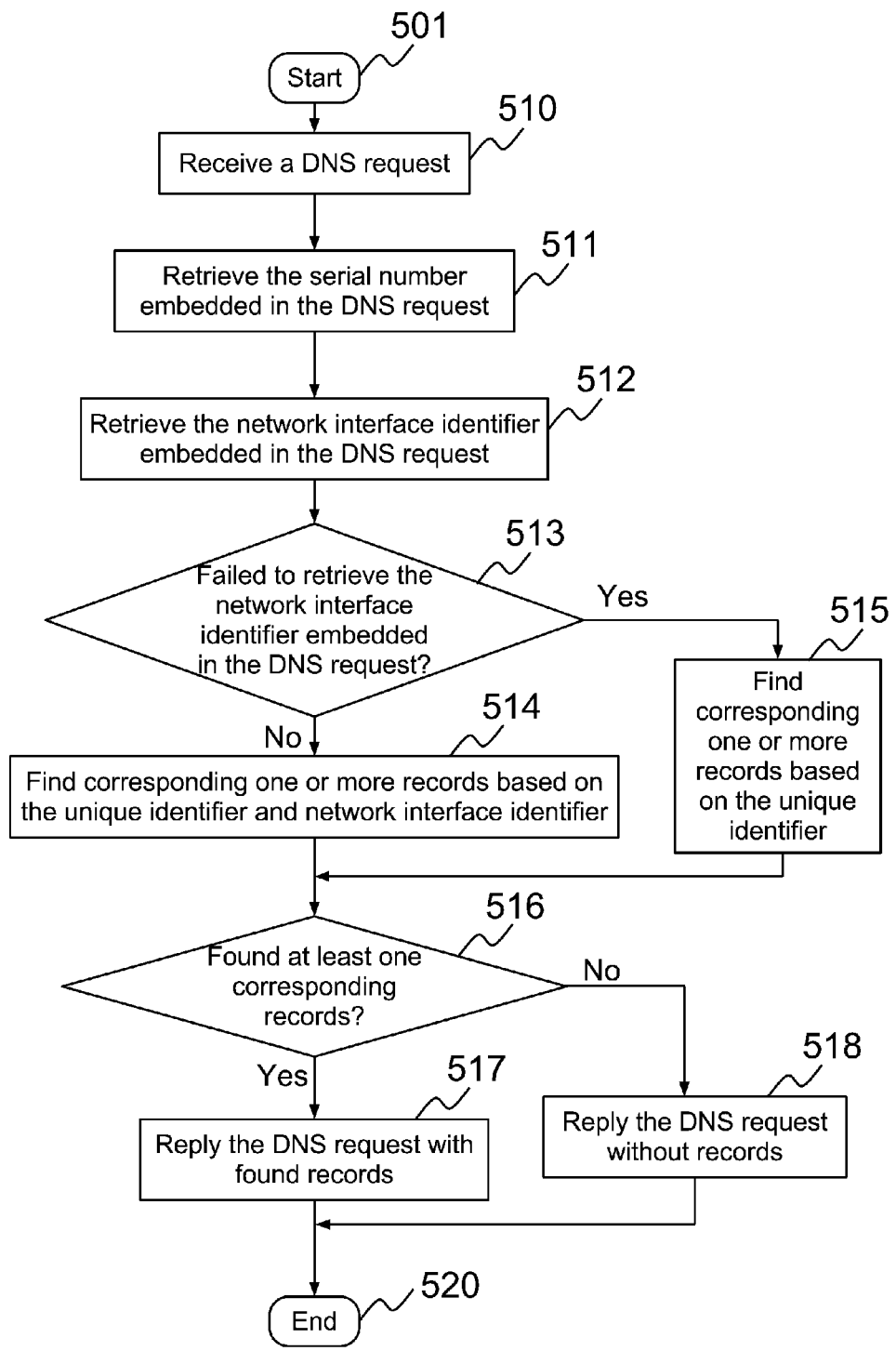
FIG. 5 illustrates a process of replying to a DNS request received by a server from a host according to one of the embodiments of the present invention.
Figure 6A:
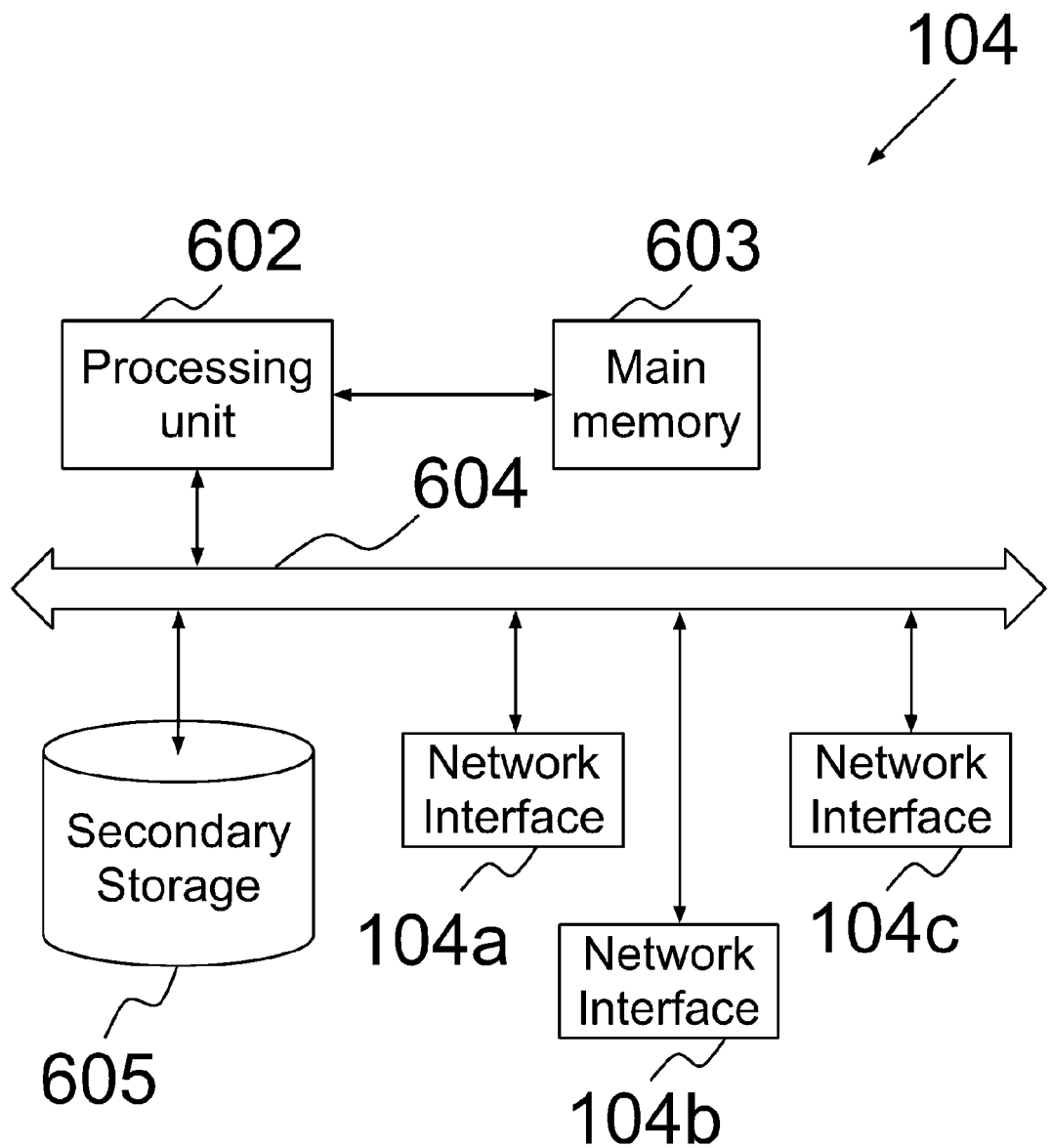
FIG. 6A is a block diagram illustrating a network node according to one of the embodiments of the present invention.
Figure 6B:
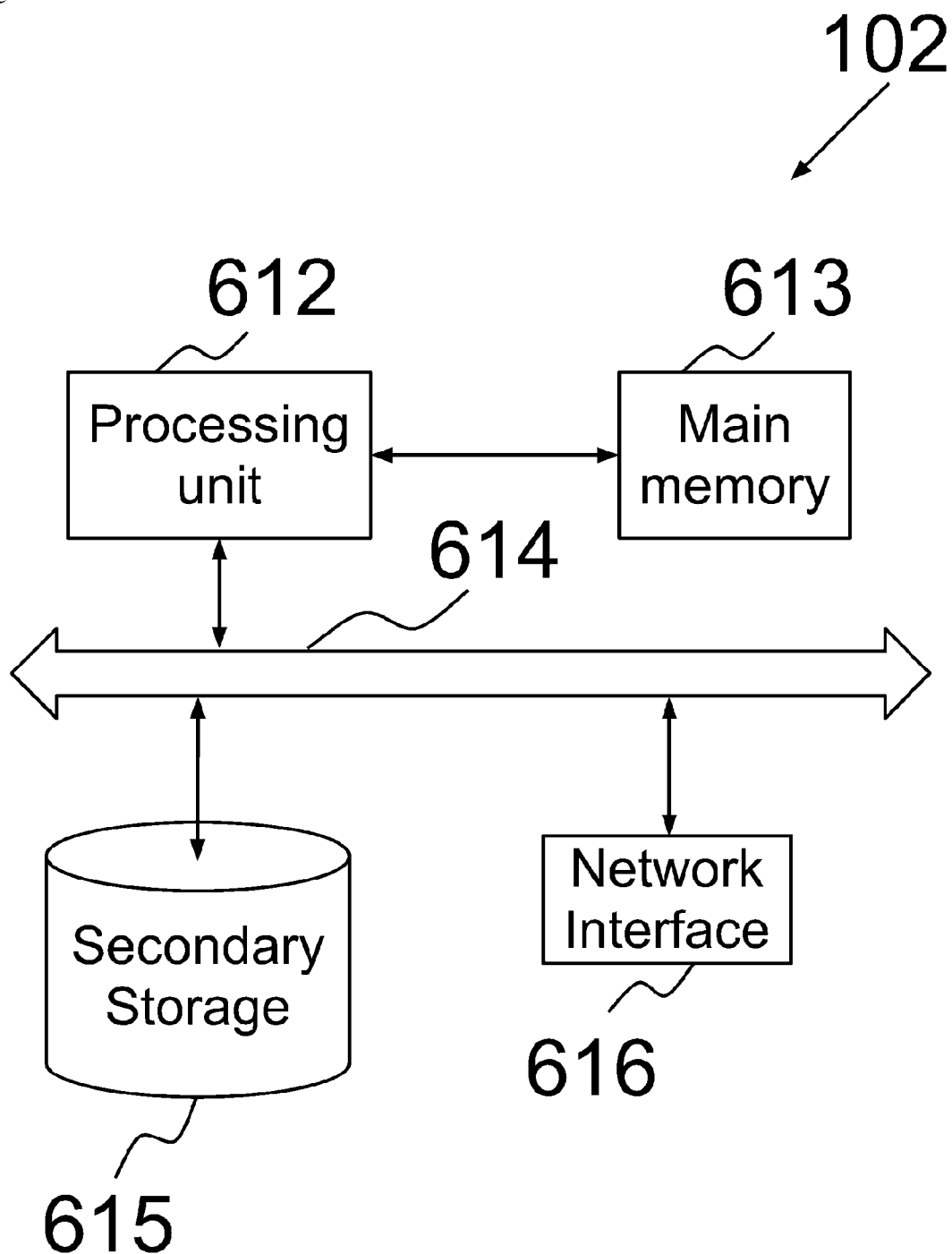
FIG. 6B is a block diagram illustrating a server according to one of the embodiments of the present invention.

The invention claimed is:

1. A method for a network node sending update messages to a first server, wherein the network node comprises a plurality of network interfaces, comprising the steps of:
   (a) determining whether a first predefined event or a second predefined event has occurred at at least one of the plurality of network interfaces connected to the internet;
   (b) sending a plurality of first update messages through the plurality of network interfaces to the first server when a first predefined event has occurred or an update message has not been sent to the first server within a predefined time period;
   (c) sending a second update message to the first server through a second network interface when a second predefined event has occurred at a first network interface;
   wherein each of update message, first update messages, and second update message is used for updating at least one Domain Name System (DNS) resource record in the first server and comprises a unique identifier, a network interface identifier and an IP address field;
   wherein the unique identifier is a character string unique to the network node, cannot be changed by a user of the network node, follows the specification of a domain name, and is not required to be a complete domain name;
   wherein each of the plurality of network interfaces has different network interface identifier when sending a plurality of first update messages at step (b);
   wherein IP address field indicates an IP address of the network interface from the plurality of network interface that is used for sending the update message when sending a plurality of first update messages at step (b);
   wherein network interface identifier in the second update message corresponds to the first network interface when sending the second update messages at step (c);
   wherein IP address field of the second update message is empty or indicates IP address of the second network interface when sending the second update message at step (c); and
   wherein the unique identifier and the network interface identifier are used by the first server to retrieve an IP address;
   wherein the first predefined event is selected from a group consisting of change of IP address of at least one of the plurality of network interfaces, assignment of IP address of at least one of the plurality of network interfaces, change of DNS resource record at least one of the plurality of network interfaces, change of performance observed at at least one of the plurality of network interfaces connected to the Internet, detection of new Dynamic Host Configuration Protocol (DHCP) server, expiration of DHCP IP address lease, status check, health check; wherein the second predefined event is selected from a group consisting of access link disconnection, deterioration of performance observed at the first network interface, and unavailability of the first network interface; wherein the first and second predefined events are selected based on preferences of an administrator of the network node; wherein the administrator is allowed to configure, create, modify, delete, and store predefined events through an access link connecting to one of the plurality of network interfaces, through the Internet, or through cloud services.

2. According to the method of claim 1, wherein the IP address in the IP address field is a public IP address.

3. According to the method of claim 1, wherein the update message is sent through a secured connection, or the update message is encrypted using a shared key or using certification-based encryption.

4. According to the method of claim 1, further comprising sending an update message through the first network interface when the first network interface becomes available.

5. According to the method of claim 1, further comprising sending a third update message to the first server when the network node decides to send only one update message instead of a plurality of first update messages, wherein the third update message comprises a unique identifier of the network node, an updated IP addresses of the plurality of network interfaces, and an optional network interface identifiers of the plurality of network interfaces.

6. A method for resolving a Domain Name System (DNS) request, comprising the steps of:
  (a) receiving a fourth update message from a network node when a first predefined event occurs at the network node; wherein the network node comprises a plurality of network interfaces; wherein the fourth update message comprises a first unique identifier, a first network interface identifier, and an IP address field; wherein the first unique identifier follows specification of domain name, and is not a complete domain name;
  (b) confirming authenticity of the fourth update message;
  (c) retrieving a first unique identifier and a first network interface identifier from the fourth update message;
  (d) when the IP address field comprises an IP address, retrieving first at least one DNS resource record from the IP address field;
  (e) when the IP address field is empty, retrieving first at least one DNS resource record from a source address of the fourth update message;
  (f) storing the first at least one DNS resource record in a non-transitory computer readable storage medium;
  (g) receiving a DNS request;
  (h) retrieving DNS resource record(s) based on in part a unique identifier, and a network interface identifier, wherein the unique identifier and the network interface identifier are embedded in the DNS request; wherein when the unique identifier is same as the first unique identifier and the network interface identifier is the same as the first network interface identifier, the DNS resource record(s) retrieved is same as the first at least one DNS resource record;
  (i) replying to the DNS requests with information, wherein the information is corresponding to the DNS resource record(s) retrieved if the DNS resource record(s) is found;
  (j) replying to the DNS requests with information, wherein the information indicates that no DNS resource record is found if the DNS resource record(s) is not found;
  (k) receiving a fifth update message when a second predefined event occurs at the network node; wherein the fifth update message comprises a second unique identifier, and an IP address field; wherein the IP address field comprises a plurality of IP addresses corresponding to the plurality of network interfaces of the network node, and wherein the fifth update message does not comprise network interface identifiers of the plurality of network interfaces;
  (l) storing the plurality of IP addresses in a non-transitory computer readable storage medium, and
  (m) considering the plurality of IP addresses to be corresponding to the second unique identifier;
  wherein the DNS resource record(s) is created based on in part at least one update message received from the network node; and
  wherein the first predefined event is selected from a group consisting of change of IP address of at least one of the plurality of network interfaces, assignment of IP address of at least one of the plurality of network interfaces, change of DNS resource record at least one of the plurality of network interfaces, change of performance observed at at least one of the plurality of network interfaces connected to the Internet, detection of new Dynamic Host Configuration Protocol (DHCP) server, expiration of DHCP IP address lease, status check, health check; wherein the second predefined event is selected from a group consisting of access link disconnection, deterioration of performance observed at a first network interface, and unavailability of the first network interface; wherein the first and second predefined events are selected based on preferences of an administrator of the network node; wherein the administrator is allowed to configure, create, modify, delete, and store predefined events through an access link connecting to one of the plurality of network interfaces, through the Internet, or through cloud services.

7. According to the method of claim 6, further comprising: retrieving DNS resource record(s) further based on in part a record type, wherein the record type is embedded in the DNS request.

8. A system for sending update messages to a first server, wherein the network node comprises:
  a plurality of network interfaces;
  at least one processor;
  at least one main memory; and
  at least one secondary storage storing program instructions executable by the at least one processor for:
    (a) determining whether a first predefined event or a second predefined event has occurred at at least one of the plurality of network interfaces connected to the Internet;
    (b) sending a plurality of first update messages through the plurality of network interfaces to the first server when the first predefined event has occurred or an update message has not been sent to the first server within a predefined time period;
    (c) sending a second update message to the first server through a second network interface when the second predefined event has occurred at a first network interface;

wherein each of update message, first update messages, and second update message is used for updating at least one Domain Name System (DNS) resource record of the plurality of network interfaces in the first server and comprises a unique identifier, a network interface identifier and an IP address field;

wherein the unique identifier is a character string unique to the network node, cannot be changed by a user of the network node, follows the specification of a domain name, and is not required to be a complete domain name;

wherein each of the plurality of network interfaces has different network interface identifier when sending a plurality of first update messages at step (b);

wherein IP address field indicates an IP address of the network interface from the plurality of network interface that is used for sending the update message when sending a plurality of first update messages at step (b);

wherein network interface identifier in the second update message corresponds to the first network interface when sending the second update messages at step (c);

wherein IP address field of the second update message is empty or indicates IP address of the second network interface when sending the second update message at step (c); and wherein the unique identifier and the network interface identifier are used by the first server to retrieve an IP address;

wherein the first predefined event is selected from a group consisting of change of IP address of at least one of the plurality of network interfaces, assignment of IP address of at least one of the plurality of network interfaces, change of DNS resource record at least one of the plurality of network interfaces, change of performance observed at at least one of the plurality of network interfaces connected to the Internet, detection of new Dynamic Host Configuration Protocol (DHCP) server, expiration of DHCP IP address lease, status check, health check; wherein the second predefined event is selected from a group consisting of access link disconnection, deterioration of performance observed at the first network interface, and unavailability of the first network interface; wherein the first and second predefined events are selected based on preferences of an administrator of the network node; wherein the administrator is allowed to configure, create, modify, delete, and store predefined events through an access link connecting to one of the plurality of network interfaces, through the Internet, or through cloud services.

9. According to the system of claim 8, wherein the IP address in the IP address field is a public IP address.

10. According to the system of claim 8, wherein the update message is sent through a secured connection, or the update message is encrypted using a shared key or using certification-based encryption.

11. According to the system of claim 8, the at least one secondary storage further comprising program instructions for: sending an update message through the first network interface when the first network interface becomes available.

12. According to the system of claim 8, the at least one secondary storage further comprising program instructions for: sending a third update message to the first server when the network node decides to send only one update message instead of a plurality of first update messages, wherein the third update message comprises unique identifier of the network node, updated IP addresses of the plurality of network interfaces, and wherein network interface identifiers of the plurality of network interfaces is optional.

13. A system for resolving a Domain Name System (DNS) request, comprising:
(a) receiving a fourth update message from a network node when a first predefined event occurs at the network node; wherein the first network node comprises a plurality of network interfaces; wherein the fourth update message comprises a first unique identifier, a first network interface identifier, and an IP address field; wherein the first unique identifier follows specification of domain name, and is not a complete domain name;
(b) confirming authenticity of the fourth update message;
(c) retrieving a first unique identifier and a first network interface identifier from the fourth update message;
(d) when the IP address field comprises an IP address, retrieving first at least one DNS resource record from the IP address field;
(e) when the IP address field is empty, retrieving first at least one DNS resource record from a source address of the fourth update message;
(f) storing the first at least one DNS resource record in a non-transitory computer readable storage medium;
(g) receiving a DNS request;
(h) retrieving DNS resource record(s) based on in part a unique identifier, and a network interface identifier, wherein the unique identifier and the network interface identifier is are embedded in the DNS request; wherein when the unique identifier is same as the first unique identifier and the network interface identifier is the same as the first network interface identifier, the DNS resource record(s) retrieved is same as the first at least one DNS resource record;
(i) replying to the DNS requests with information, wherein the information is corresponding to the DNS resource record(s) retrieved if the DNS resource record(s) is found;
(j) replying to the DNS requests with information, wherein the information indicates that no DNS resource record is found if the DNS resource record(s) is not found;
(k) receiving a fifth update message when a second predefined event occurs at the network node; wherein the fifth update message comprises a second unique identifier, and an IP address field; wherein the IP address field comprises a plurality of IP addresses corresponding to plurality of network interfaces of the network node, and wherein the fifth update message does not comprise network interface identifiers of the plurality of network interfaces;
(l) storing the plurality of IP addresses in a non-transitory computer readable storage medium, and
(m) considering the plurality of IP addresses to be corresponding to the second unique identifier;
wherein the DNS resource record(s) is created based on in part at least one update message received from a network node; and
wherein the first predefined event is selected from a group consisting of change of IP address of at least one of the plurality of network interfaces, assignment of IP address of at least one of the plurality of network interfaces, change of DNS resource record at least one of the plurality of network interfaces, change of performance observed at at least one of the plurality of network interfaces connected to the Internet, detection of new Dynamic Host Configuration Protocol (DHCP) server, expiration of DHCP IP address lease, status check, health check; wherein the second predefined event is selected from a group consisting of access link disconnection, deterioration of performance observed at a first network interface, and unavailability of the first network interface; wherein the first and second predefined events are selected based on preferences of an administrator of the network node; wherein the administrator is allowed to configure, create, modify, delete, and store predefined events through an access link connecting to one of the plurality of network interfaces, through the Internet, or through cloud services.

14. According to the system of claim 13, the at least one secondary storage further storing program instructions for: retrieving DNS resource record(s) further based on in part a record type, wherein the record type is embedded in the DNS request.

\* \* \* \* \*